(12) United States Patent
Bian et al.

(10) Patent No.: US 11,880,065 B2
(45) Date of Patent: Jan. 23, 2024

(54) EDGE COUPLERS INTEGRATED WITH DUAL RING RESONATORS

(71) Applicant: GlobalFoundries U.S. Inc., Malta, NY (US)

(72) Inventors: Yusheng Bian, Ballston Lake, NY (US); Steven M. Shank, Jericho, VT (US); Takako Hirokawa, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 24 days.

(21) Appl. No.: 17/588,470

(22) Filed: Jan. 31, 2022

(65) Prior Publication Data

US 2023/0244030 A1  Aug. 3, 2023

(51) Int. Cl.
| | | |
|---|---|---|
| *G02B 6/12* | (2006.01) | |
| *G02B 6/13* | (2006.01) | |
| *G02B 6/293* | (2006.01) | |

(52) U.S. Cl.
CPC .......... *G02B 6/12007* (2013.01); *G02B 6/13* (2013.01); *G02B 6/29338* (2013.01)

(58) Field of Classification Search
None
See application file for complete search history.

(56) References Cited

U.S. PATENT DOCUMENTS

| | | | |
|---|---|---|---|
| 6,411,752 B1 | 6/2002 | Little et al. | |
| 6,865,314 B1* | 3/2005 | Blair | G02B 6/12007 385/27 |
| 9,086,387 B2 | 7/2015 | Assefa et al. | |
| 10,816,726 B1 | 10/2020 | Peng et al. | |
| 11,029,465 B1 | 6/2021 | Rakowski et al. | |
| 2007/0223859 A1* | 9/2007 | Kornilovich | G09F 9/00 385/27 |
| 2009/0185803 A1* | 7/2009 | Uemura | G02B 6/12007 398/43 |
| 2017/0139237 A1 | 5/2017 | Luo et al. | |
| 2020/0243701 A1* | 7/2020 | Kurczveil | G02B 6/29343 |
| 2020/0280173 A1 | 9/2020 | Gao et al. | |
| 2021/0156687 A1 | 5/2021 | Paniccia | |

OTHER PUBLICATIONS

Jonathan T. Bessette and Donghwan Ahn, "Vertically stacked microring waveguides for coupling between multiple photonic planes," Opt. Express 21, 13580-13591 (2013).

(Continued)

*Primary Examiner* — Chad H Smith
(74) *Attorney, Agent, or Firm* — Thompson Hine LLP; Anthony Canale

(57) ABSTRACT

Structures including an edge coupler and methods of fabricating a structure including an edge coupler. The structure includes an edge coupler having a longitudinal axis, a first ring resonator, and a second ring resonator. The first ring resonator has a first center point that is spaced from the longitudinal axis of the edge coupler by a first perpendicular distance. The second ring resonator has a second center point that is spaced from the longitudinal axis of the edge coupler by a second perpendicular distance.

20 Claims, 13 Drawing Sheets

(56) References Cited

OTHER PUBLICATIONS

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America), paper FW5D.2 (2020).

K. Giewont et al., "300-mm Monolithic Silicon Photonics Foundry Technology," in IEEE Journal of Selected Topics in Quantum Electronics, vol. 25, No. 5, pp. 1-11, Art No. 8200611, doi: 10.1109/JSTQE.2019.2908790 (Sep.-Oct. 2019).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America), paper T3H.3 (2020).

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optical Society of America), paper Th1A.46 (2021).

A. Aboketaf et al., "Towards fully automated testing and characterization for photonic compact modeling on 300-mm wafer platform," 2021 Optical Fiber Communications Conference and Exhibition (OFC), pp. 1-3 (2021).

Brian Stern et al., "Compact narrow-linewidth integrated laser based on a low-loss silicon nitride ring resonator," Optics Letters, 42, 4541-4544 (2017).

Arash Hosseinzadeh and Christopher T. Middlebrook, "Highly linear dual ring resonator modulator for wide bandwidth microwave photonic links," Optics Express 24, 27268-27279 (2016).

European Patent Office, Extended European Search Report and Written Opinion issued in European Patent Application No. 22197933.9 dated Jul. 4, 2023 (10 pages).

\* cited by examiner

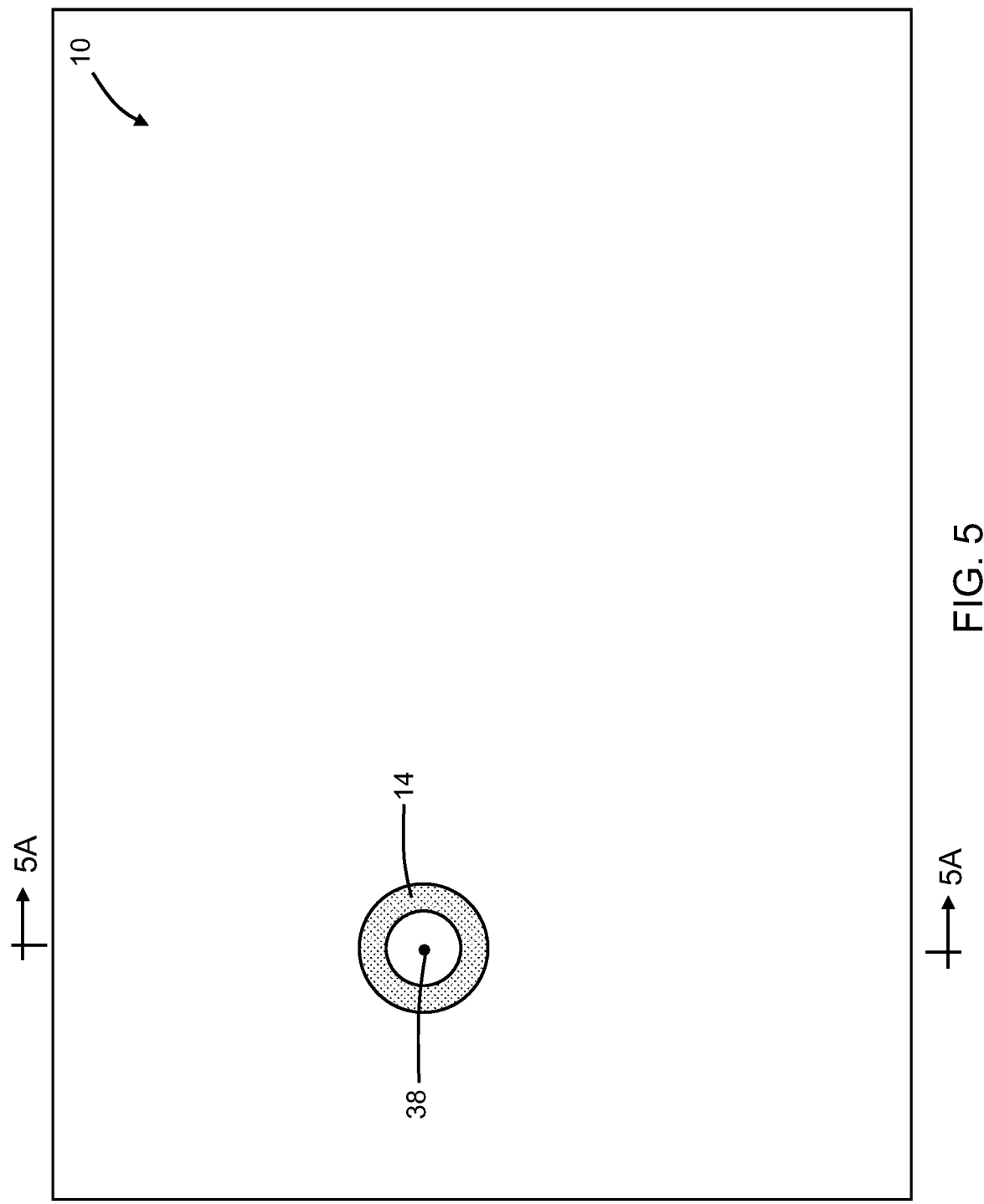

EDGE COUPLERS INTEGRATED WITH DUAL RING RESONATORS

BACKGROUND

The disclosure relates to photonics chips and, more specifically, to structures including an edge coupler and methods of fabricating a structure including an edge coupler.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Factors such as layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper located adjacent to the light source. In the edge coupler construction, the narrow end of the inverse taper provides a facet that is positioned adjacent to the light source, and the wide end of the inverse taper is connected with another section of the waveguide core that routes the light to the optical components of the photonics chip.

The gradually-varying cross-sectional area of the inverse taper supports mode transformation and mode size variation associated with mode conversion when light is transferred from the light source to the edge coupler. The narrow end at the tip of the inverse taper is unable to fully confine the incident mode received from the light source because the cross-section area of the tip at its narrow end is considerably smaller than the mode size. Consequently, a significant percentage of the electromagnetic field of the incident mode is distributed about the tip of the inverse taper. As its width increases, the inverse taper can eventually support the entire incident mode and confine the electromagnetic field.

Improved structures including an edge coupler and methods of fabricating a structure including an edge coupler are needed.

SUMMARY

In an embodiment of the invention, a structure includes an edge coupler having a longitudinal axis, a first ring resonator, and a second ring resonator. The first ring resonator has a first center point that is spaced from the longitudinal axis of the edge coupler by a first perpendicular distance. The second ring resonator has a second center point that is spaced from the longitudinal axis of the edge coupler by a second perpendicular distance.

In an embodiment of the invention, a method includes forming an edge coupler having a longitudinal axis, forming a first ring resonator having a first center point that is spaced from the longitudinal axis of the edge coupler by a first perpendicular distance, and forming a second ring resonator having a second center point that is spaced from the longitudinal axis of the edge coupler by a second perpendicular distance.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 5 is a top view of a structure at an initial fabrication stage of a processing method in accordance with alternative embodiments of the invention.

DETAILED DESCRIPTION

Figure 1:
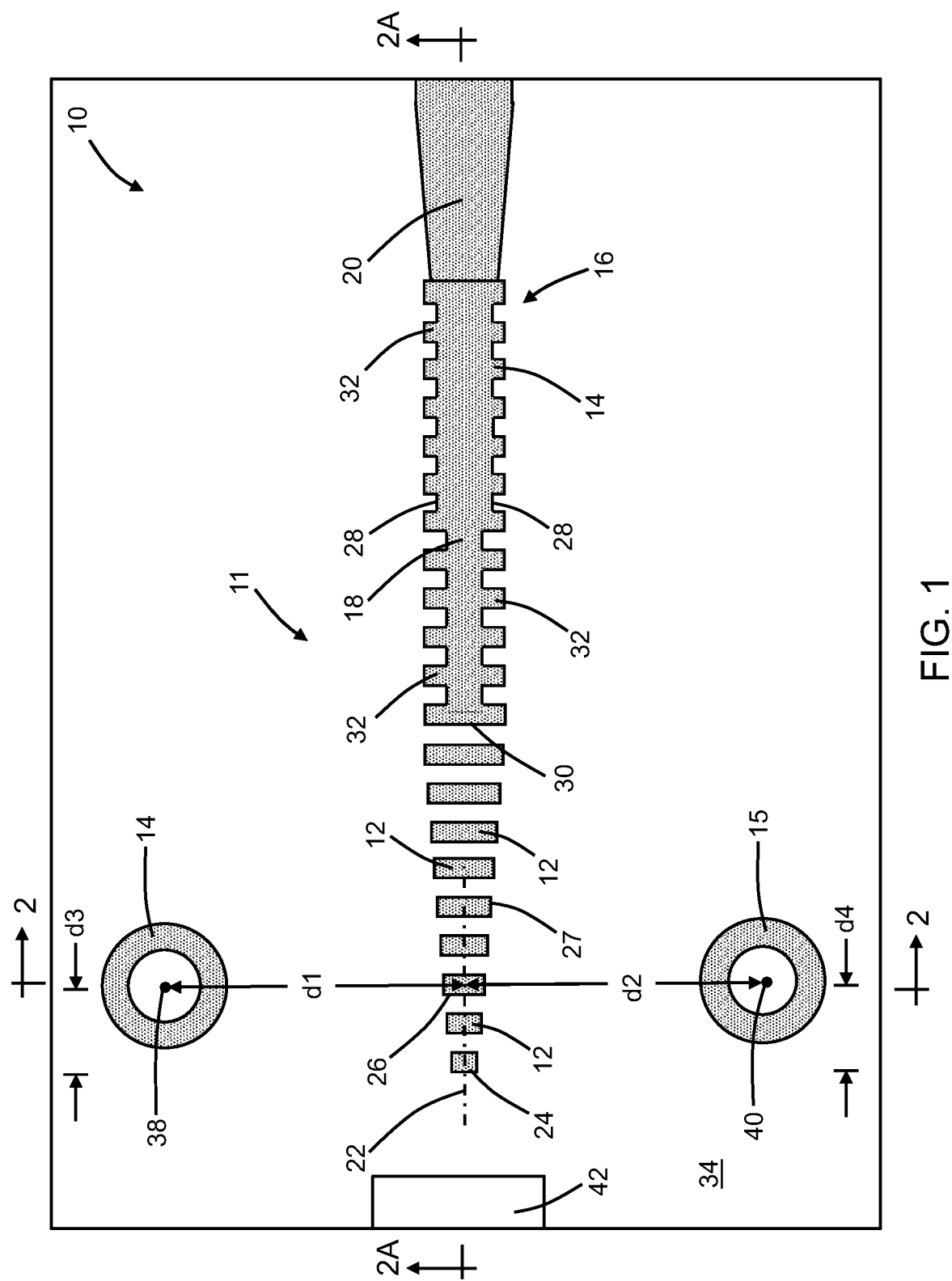
FIG. 1 is a top view of a structure at an initial fabrication stage of a processing method in accordance with embodiments of the invention.
Figure 2:
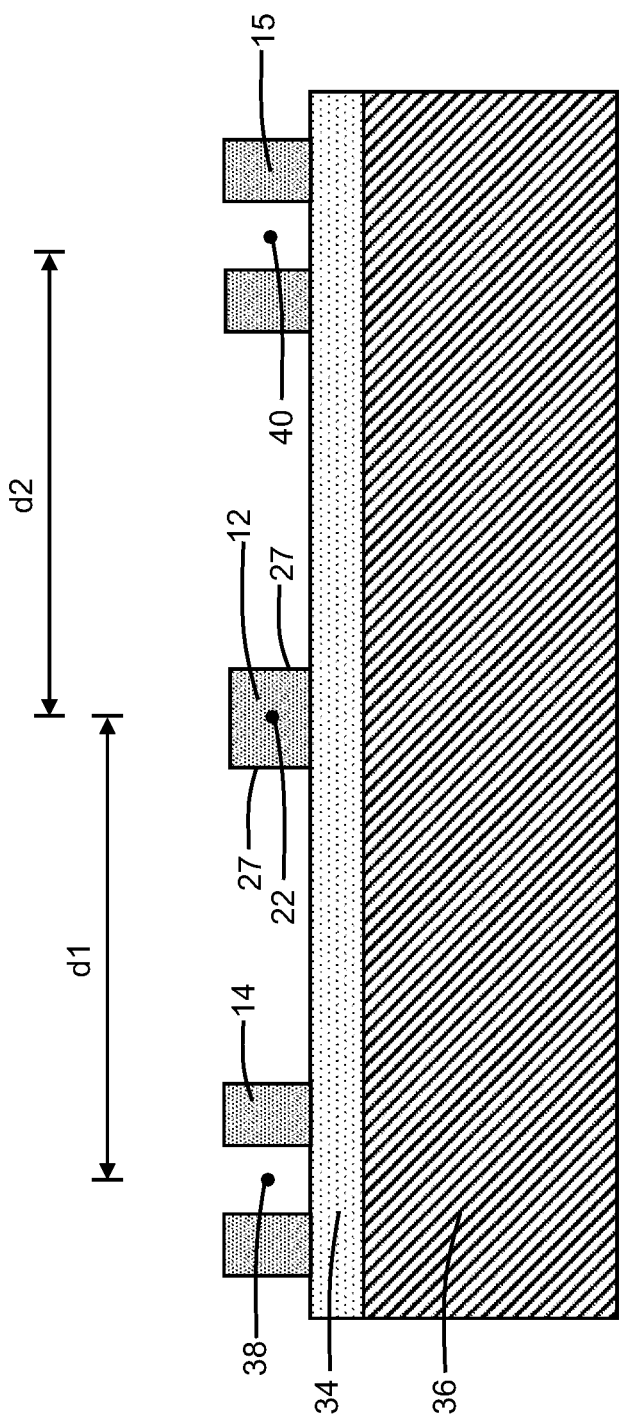
FIG. 2 is a cross-sectional view of the structure taken generally along line 2-2 in FIG. 1.
Figure 2A:
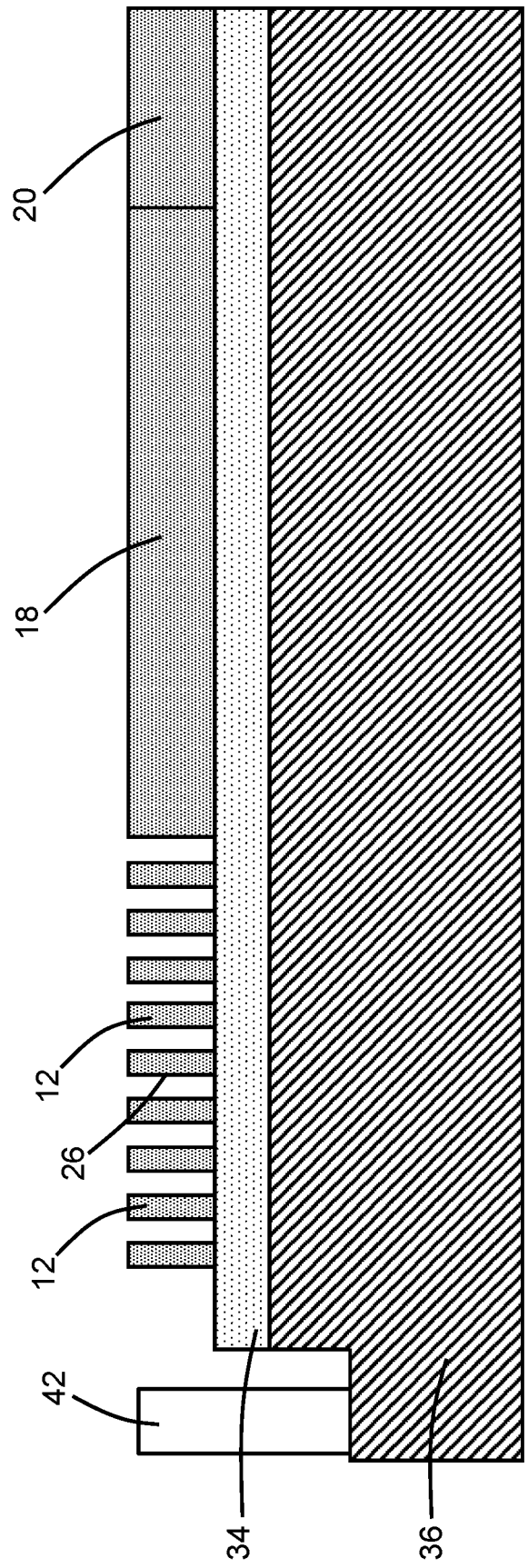
FIG. 2A is a cross-sectional view of the structure taken generally along line 2A-2A in FIG. 1.

With reference to FIGS. 1, 2, 2A and in accordance with embodiments of the invention, a structure 10 includes an edge coupler 11 having multiple segments 12 and a waveguide core 16, as well as a ring resonator 14 and a ring resonator 15. The waveguide core 16, which is positioned adjacent to the segments 12, includes a waveguide core section 18 and a waveguide core section 20. The segments 12 and the waveguide core sections 18, 20 are arranged along a longitudinal axis 22. The waveguide core section 18 is longitudinally positioned between the segments 12 and the waveguide core section 20.

The segments 12 are features of varying length located in a portion of the structure 10 that initially receives the light (e.g., laser light or light from an optical fiber) at a facet 24 located at the tip of the edge coupler 11. Light propagates within the structure 10 in a direction from the segments 12 toward the waveguide core sections 18, 20. The segments 12 constitute discrete pegs that are positioned with a spaced arrangement along the longitudinal axis 22 and with adjacent pairs of segments 12 separated by a gap. Each of the segments 12 has opposite sidewalls 26 that border the gaps, as well as opposite sidewalls 27 at its side edges. The segments 12, which increase in width with increasing distance from the facet 24, define an inverse taper, and the sidewall 26 of the segment 12 that terminates the edge coupler 11 provides a surface (e.g., a planar surface) defining the facet 24. An inverse taper refers to a tapered section of a waveguide core characterized by a gradual increase in width along a mode propagation direction.

The waveguide core section 18 is located in a portion of the structure 10 that transfers the light from the segments 12 to the waveguide core section 20. Light is guided by the waveguide core section 20 from the structure 10 to other optical components on the photonics chip, such as a modulator or a photodetector. The waveguide core section 18 includes notched sidewalls 28 and terminates at an end surface 30 adjacent to the segments 12. The waveguide core section 18 is a "fishbone" structure that includes a series of projections 32 as features that are arranged along each of its opposite notched sidewalls 28. In that regard, the opposite notched sidewalls 28 include indentations or grooves defining notches between adjacent pairs of the projections 32. The projections 32 are positioned in respective spaced arrangements along the longitudinal axis 22 and extend outwardly in respective opposite directions that are transverse to the longitudinal axis 22. The segments 12 may be positioned in a row adjacent to the end surface 30, and the end surface 30 may terminate the waveguide core section 18. The waveguide core section 20 may be continuous and lack notches.

The segments 12 and waveguide core 16 may be positioned over a dielectric layer 34. In an embodiment, the dielectric layer 34 may be comprised of silicon dioxide. In an embodiment, the dielectric layer 34 may be a buried oxide layer of a silicon-on-insulator substrate, and the silicon-on-insulator substrate may further include a handle substrate 36 comprised of a semiconductor material (e.g., single-crystal silicon) beneath the buried oxide layer.

The segments 12 and the waveguide core 16 may be comprised of a semiconductor material, such as single-crystal silicon. In an embodiment, the segments 12 and the waveguide core 16 may be concurrently formed by patterning a single-crystal silicon device layer of a silicon-on-insulator substrate with lithography and etching processes. In an embodiment, the ring resonators 14, 15 may be comprised of the same material as the edge coupler 11, and may be patterned concurrently with the segments 12 and the waveguide core 16 are patterned. In that regard, the ring resonators 14, 15 may also be comprised of a semiconductor material, such as single-crystal silicon.

The segments 12 and projections 32 may be dimensioned and positioned at small enough pitch along the longitudinal axis 22 so as not to radiate or reflect light at the wavelength of operation and, when the gaps are filled by dielectric material, to act as an effective optical material known as a metamaterial. In that regard, the segments 12 and projections 32 may define respective sub-wavelength gratings. The wavelength of the laser light being received by the edge coupler 11 may be, for example, in a range of 1260 nm to 1360 nm (the O-band).

In alternative embodiments, the edge coupler 11 may be modified to have a different construction. For example, the segments 12 and waveguide core 16 may be replaced by a single inverse taper. As another example, an inverse taper may be overlaid on the segments 12 such that the segments 12 are connected together.

The ring resonator 14 has a center point 38 that is laterally spaced or offset by a perpendicular distance d1 from the longitudinal axis 22 of the edge coupler 11, and the ring resonator 15 has a center point 40 that is laterally spaced or offset by a perpendicular distance d2 from the longitudinal axis 22 of the edge coupler 11. In the representative embodiment, the segments 12 of the edge coupler 11 are laterally positioned between the ring resonator 14 and the ring resonator 15. In an embodiment, the perpendicular distance d1 and the perpendicular distance d2 may be equal such that the ring resonators 14, 15 have a symmetrical placement in a lateral direction transverse to the longitudinal axis 22 and the direction of light propagation. In an embodiment, the perpendicular distance d1 and the perpendicular distance d2 may be substantially equal such that the ring resonators 14, 15 have a substantially symmetrical placement in a lateral direction transverse to the longitudinal axis 22 and the direction of light propagation.

The perpendicular distances d1, d2 respectively separating the ring resonators 14, 15 from the edge coupler 11 are selected such that the insertion loss is not significantly increased by the introduction of the ring resonators 14, 15. For example, the perpendicular distances d1, d2 may be on the order of the mode size of the light received by the edge coupler 11 to ensure weak optical coupling. As a numerical example, if the mode size is 10 microns, the perpendicular distances d1, d2 may be approximately 5 microns. Most of the received light continues to propagate unimpeded through the edge coupler 11 due to the minimal impact on insertion loss. Symmetrical placement of the ring resonators 14, 15 may also further reduce the insertion loss by eliminating directional bias of the light coupling to the ring resonators 14, 15. The relatively-large perpendicular distances between the ring resonators 14, 15 and the edge coupler 11 also reduce the manufacturing risk presented to the optical path by the introduction of the ring resonators 14, 15.

The center point 38 of the ring resonator 14 may be longitudinally spaced or offset by a perpendicular distance d3 from a plane including the facet 24 of the edge coupler 11, and the center point 40 of the ring resonator 15 may be longitudinally spaced or offset by a perpendicular distance d4 from the plane including the facet 24 of the edge coupler 11. In an embodiment, the perpendicular distances d3, d4 may be equal such that the ring resonators 14, 15 have a symmetrical placement in a longitudinal direction parallel to the longitudinal axis 22 and parallel to the direction of light propagation. In an embodiment, the perpendicular distances d3, d4 may be substantially equal such that the ring resonators 14, 15 have a substantially symmetrical placement in a longitudinal direction parallel to the longitudinal axis 22 and parallel to the direction of light propagation.

In an embodiment, the ring resonators 14, 15 may be closed loops or rings having the edge coupler 11 as an input and lacking an output because of the special-purpose use, as subsequently described. In an embodiment, the ring resonator 14 may be an annular waveguide core that is centered about the center point 38 and bounded by concentric inner and outer ring-shaped edges that are centered on the center point 38. In an embodiment, the ring resonator 15 may be an annular waveguide core that is centered about the center point 40 and bounded by concentric inner and outer circular edges that are centered on the center point 40.

In an alternative embodiment, the edge coupler 11 and the ring resonators 14, 15 may be comprised of a dielectric material, such as silicon nitride, that is deposited and patterned by lithography and etching processes. In alternative embodiments, edge coupler 11 and the ring resonators 14, 15 may be comprised of a different dielectric material, such as silicon oxynitride, as well as comprised of other non-dielectric materials such as a III-V compound semiconductor material or a polymer.

Light (e.g., laser light) may be directed from a light source 42 toward the facet 24 of the edge coupler 11. The light may have a given wavelength, intensity, mode shape, and mode size, and the edge coupler 11 may provide spot size conversion for the light. In an embodiment, the light source 42 may be a semiconductor laser. In an embodiment, the light source 42 may be an optical fiber (e.g., a single mode fiber). In an embodiment, the handle substrate 36 may include a groove configured to receive the semiconductor laser and place the output of the semiconductor laser in alignment with the facet 24 of the edge coupler 11. In an embodiment, the handle substrate 36 may include a groove configured to receive the tip of the optical fiber in alignment with the facet 24 of the edge coupler 11, and the groove may include an undercut that extends in the handle substrate 36 beneath the dielectric layer 34 and under a portion of the edge coupler 11.

Figure 3:
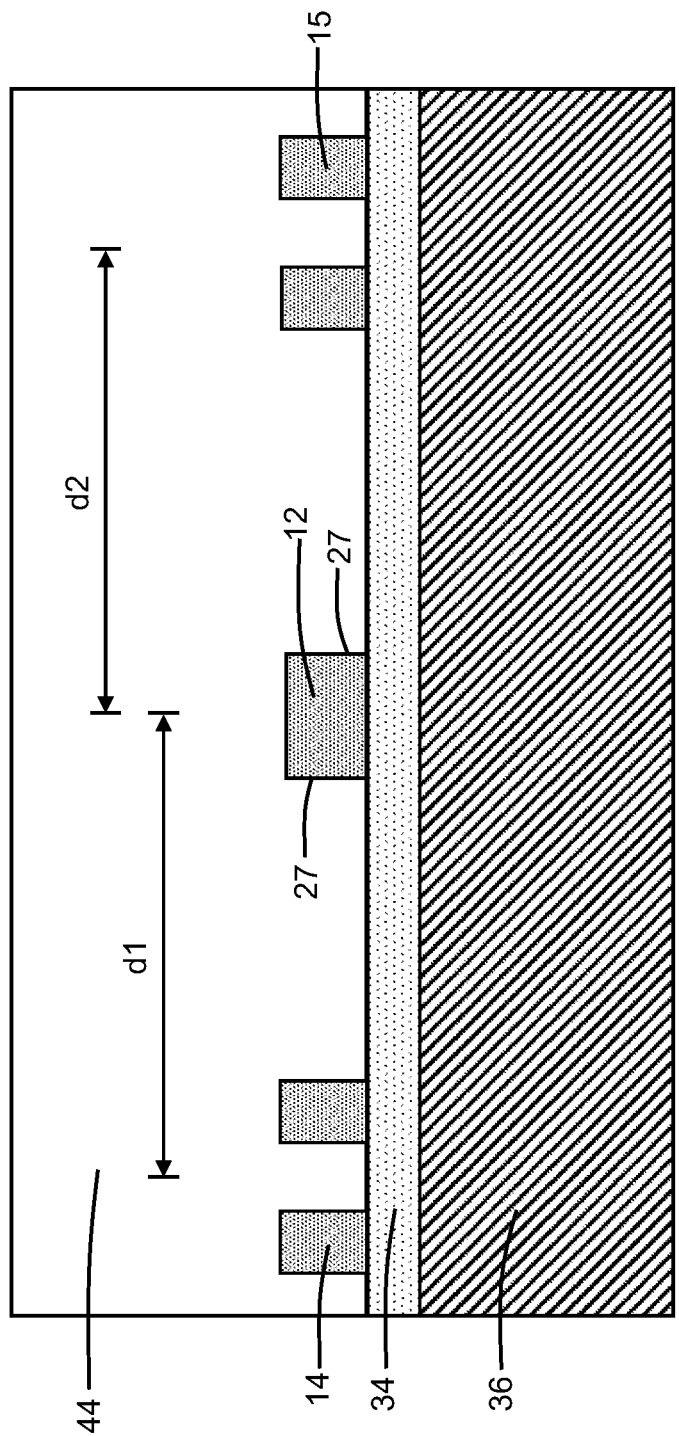
FIGS. 3, 3A are cross-sectional views of the structure at a fabrication stage subsequent to FIGS. 2, 2A.
Figure 3A:
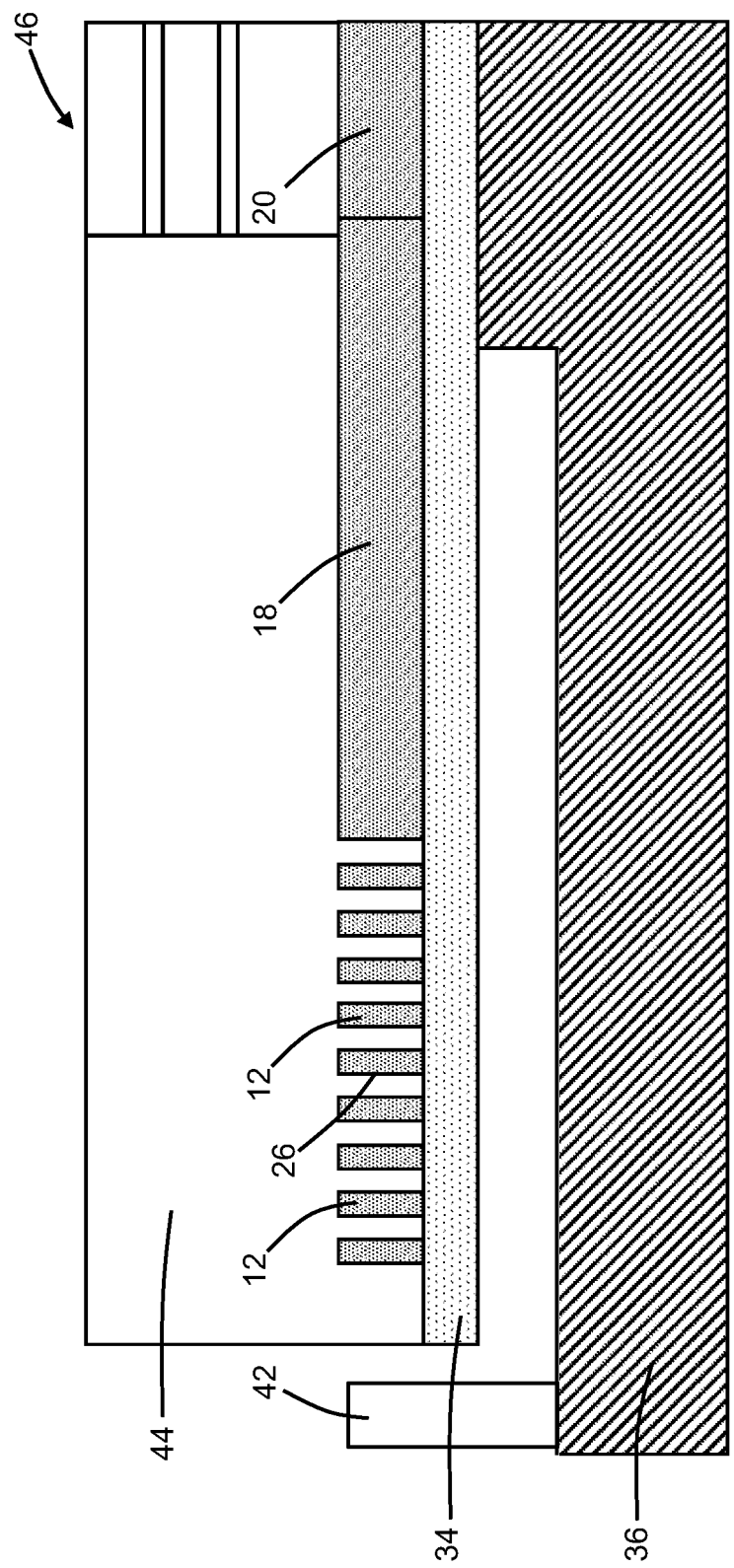

With reference to FIGS. 3, 3A in which like reference numerals refer to like features in FIGS. 2, 2A and at a subsequent fabrication stage, a dielectric layer 44 is positioned over the ring resonators 14, 15 and the segments 12 and waveguide core 16 of the edge coupler 11. The dielectric layer 44 may be comprised of a dielectric material, such as silicon dioxide. The dielectric material of the dielectric layer 44 fills the gaps between the segments 12. The dielectric layer 44 replaces a removed section of a back-end-of-line stack 46. The back-end-of-line stack 46 may include interlayer dielectric layers and intralayer dielectric layers of different composition that alternate in a heterogenous layer stack.

The structure 10, in any of its embodiments described herein, may be integrated into a photonics chip that includes electronic components and additional optical components, or the structure 10 may be integrated into a standalone chip that only includes optical components. For example, the electronic components may include field-effect transistors that are fabricated by CMOS processing.

In use, light is received by the edge coupler 11 from the light source 42. A small portion of the light will be evanescently coupled into each of the ring resonators 14, 15. The coupling arises from the evanescent field that extends outside of the waveguide mode of the received light in an exponentially-decreasing radial profile. The ring resonators 14, 15 are laterally spaced from the edge coupler 11 such that the light coupling is weak, and the resonance condition is selected such that the light coupling with the ring resonators 14, 15 is intermittent. The result is a perturbation in the optical signal manifested by intermittent observable dips in light intensity that are superimposed as a ripple on an otherwise constant light intensity. Cumulatively, the dips in light intensity have negligible impact on the insertion loss due to the weak coupling, but impart an observable perturbation superimposed on the received light.

Because the ring resonators 14, 15 are polarization-sensitive optical components, the ring resonators 14, 15 are capable of coupling with light of either polarization. The physical properties (e.g., ring size, perpendicular distances, and other dimensions) of the ring resonators 14, 15 may be selected such that light of the transverse electric polarization or light of the transverse magnetic polarization, but not both, exhibit the perturbation. For that reason, the perturbation permits light characterized by the transverse electric polarization and light characterized by the transverse magnetic polarization to be distinguished so that the polarization mode of the light received by the edge coupler 11 is detectable.

Figure 4:
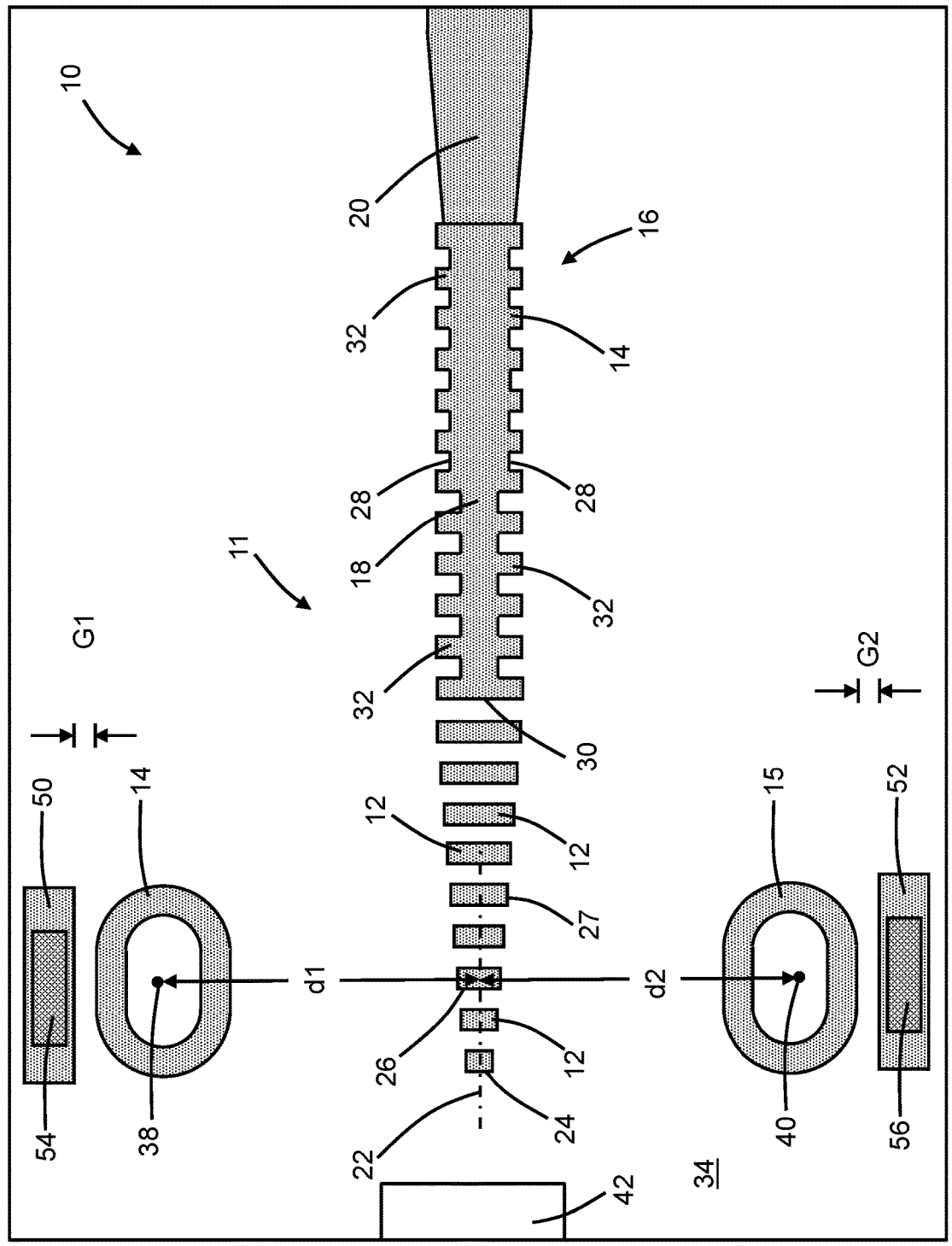
FIG. 4 is a top view of a structure in accordance with alternative embodiments of the invention.

With reference to FIG. 4 in which like reference numerals refer to like features in FIG. 1 and in accordance with alternative embodiments of the invention, the structure 10 may be modified to add a waveguide core 50 adjacent to the ring resonator 14, and a waveguide core 52 adjacent to the ring resonator 15. The waveguide core 50 is spaced from the ring resonator 14 by a gap G1, and the waveguide core 52 is spaced from the ring resonator 15 by a gap G2. In an embodiment, the gap G2 may be equal to the gap G1. In an embodiment, the gap G2 may be greater than the gap G1.

The waveguide cores 50, 52 may be comprised of the same material (e.g., silicon) as the edge coupler 11 and ring resonators 14, 15, and the waveguide cores 50, 52 may be concurrently formed along with the edge coupler 11 and ring resonators 14, 15.

The waveguide core 50 includes an absorber 54, and the waveguide core 52 also includes an absorber 56. The absorbers 54, 56 may be comprised of a material, such as germanium, that strongly absorbs light, and the absorbers 54, 56 may be formed in trenches patterned in the respective waveguide cores 50, 52.

The waveguide cores 50, 52 define drop ports in the structure 10. Light that is evanescently coupled from the edge coupler 11 to the ring resonator 14 is subsequently coupled from the ring resonator 14 to the waveguide core 50 and absorbed by the absorber 54. Similarly, light that is evanescently coupled from the edge coupler 11 to the ring resonator 15 is subsequently coupled from the ring resonator 15 to the waveguide core 52 and absorbed by the absorber 56.

In addition, the shapes of the ring resonators 14, 15 may be altered such that each is a racetrack waveguide with rounded or curved ends connected by parallel straight sections that may each be aligned parallel to the longitudinal axis 22. The straight sections nearest to the edge coupler 11 may operate to increase the coupling length of the ring resonators 14, 15 with the edge coupler 11. The straight sections farthest from the edge coupler 11 may operate to increase the coupling length with the waveguide cores 50, 52, if the optional waveguide cores 50, 52 are present.

In an alternative embodiment, the waveguide cores 50, 52 and absorbers 54, 56 may be used in conjunction with the ring resonators 14, 15 that are ring-shaped (FIG. 1). In an alternative embodiment, the ring resonators 14, 15 including racetrack waveguides may replace the ring-shaped ring resonators 14, 15 of FIG. 1.

Figure 5A:
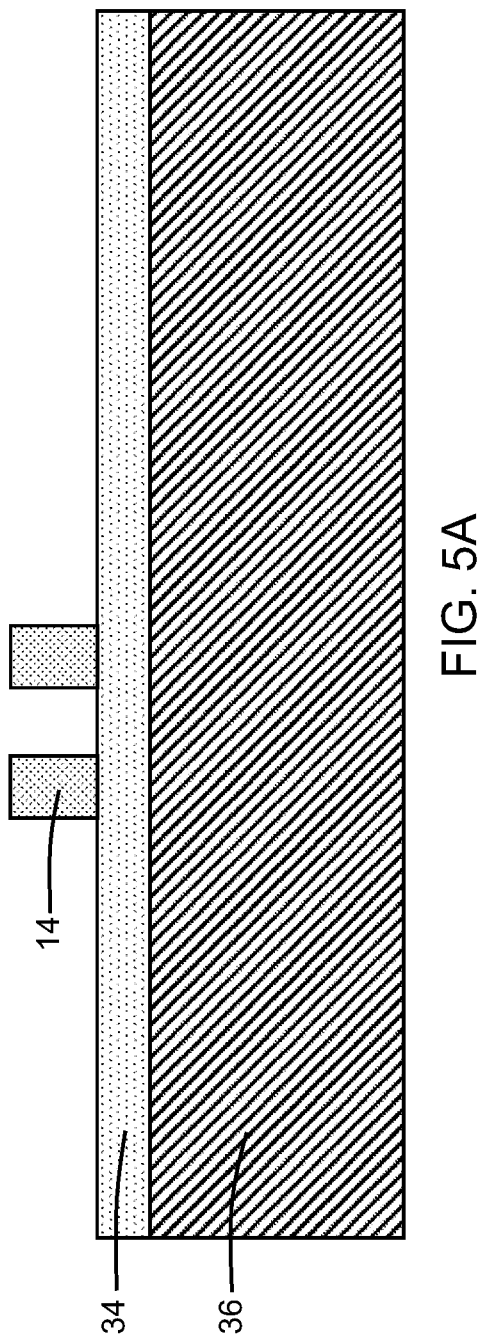
FIG. 5A is a cross-sectional view of the structure taken generally along line 5A-5A in FIG. 5.

With reference to FIGS. 5, 5A and in accordance with alternative embodiments of the invention, the structure 10 may be rearranged such that the ring resonator 14 is positioned below the edge coupler 11 and the ring resonator 15 is positioned above the edge coupler 11 in a multi-level arrangement. The result is that the edge coupler 11 is positioned in a vertical direction (i.e., in elevation) between the ring resonator 14 and the ring resonator 15.

In an initial fabrication stage, the ring resonator 14 may be formed on the dielectric layer 34. In an embodiment, the ring resonator 14 may be comprised of a dielectric material, such as silicon nitride, that is deposited and patterned by lithography and etching processes. In alternative embodiments, the ring resonator 14 may be comprised of a different dielectric material, such as silicon oxynitride, as well as other non-dielectric materials such as a III-V compound semiconductor material or a polymer. In an embodiment, the ring resonator 14 may comprise an annular waveguide core. In an alternative embodiment, the ring resonator 14 may comprise a racetrack waveguide core (FIG. 4). In an alternative embodiment, the waveguide core 50 and the absorber 54 included in the waveguide core 50 (FIG. 4) may be formed adjacent to the ring resonator 14.

Figure 6:
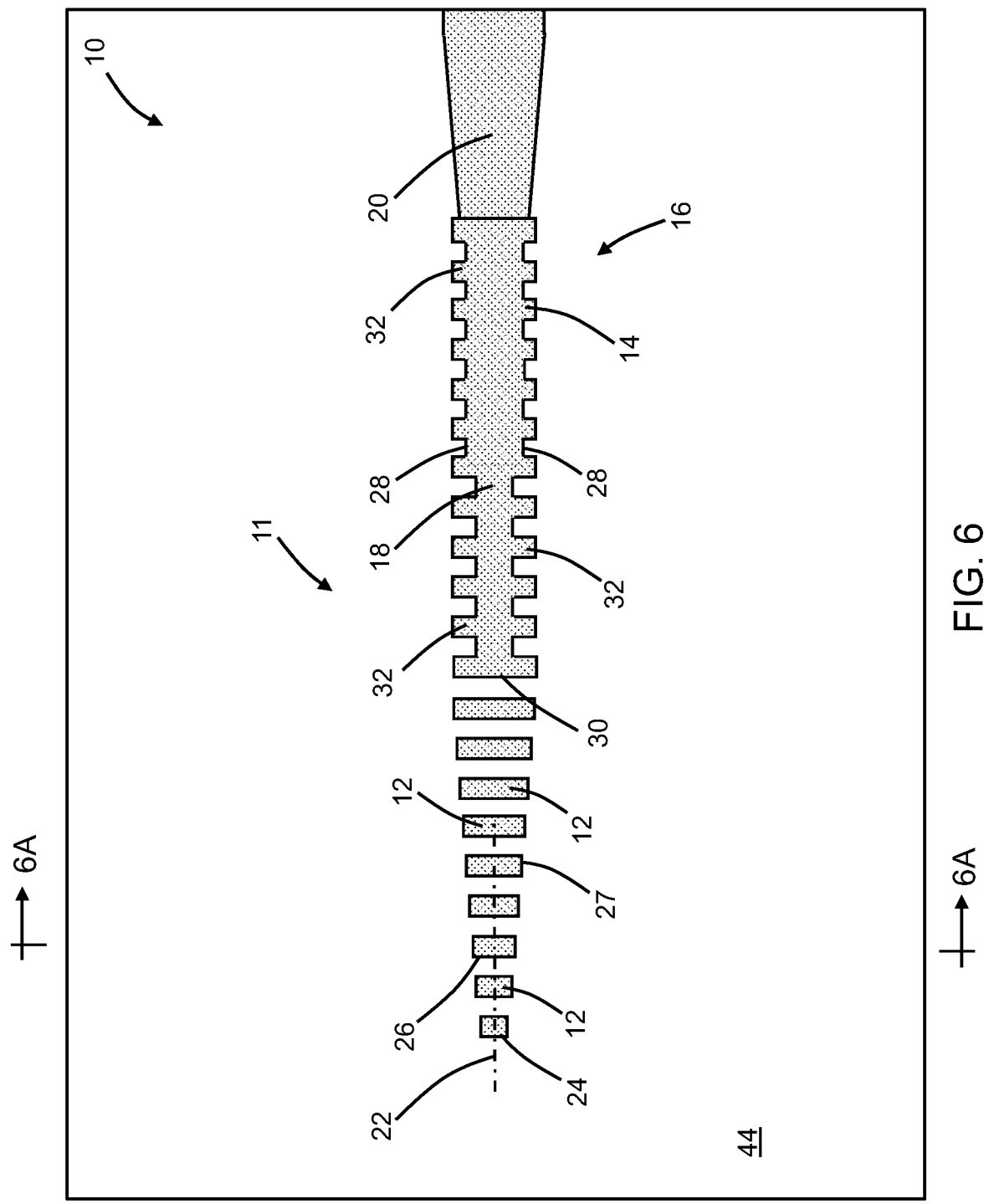
FIG. 6 is a top view of the structure at a fabrication stage subsequent to FIG. 5.
Figure 6A:
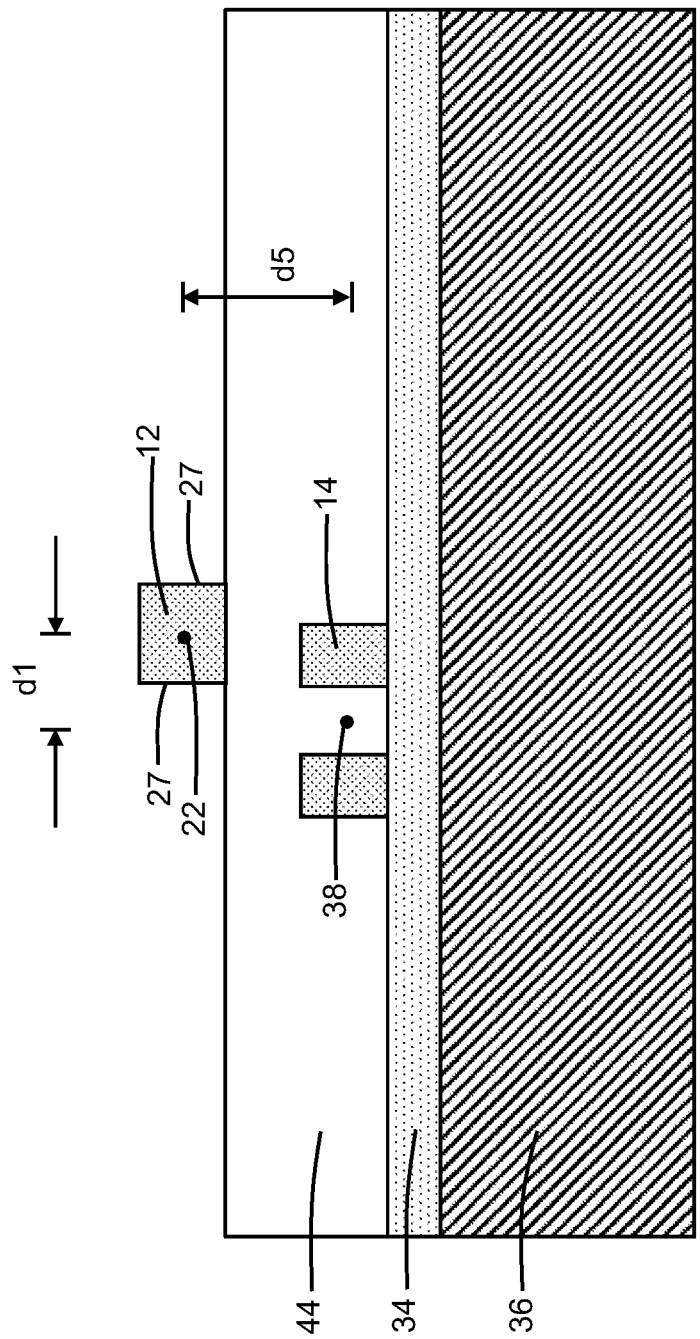
FIG. 6A is a cross-sectional view of the structure taken generally along line 6A-6A in FIG. 6.

With reference to FIGS. 6, 6A in which like reference numerals refer to like features in FIGS. 5, 5A and at a subsequent fabrication stage, the dielectric layer 44 is formed over the ring resonator 14, and the edge coupler 11 is formed on the dielectric layer 44. The dielectric layer 44 may fully separate the ring resonator 14 from the edge coupler 11 with an intervening thickness of dielectric material therebetween. In an embodiment, the edge coupler 11 may be comprised of the same material as the ring resonator 14. In an embodiment, the edge coupler 11 may be comprised of a dielectric material, such as silicon nitride, that is deposited and patterned by lithography and etching processes. In alternative embodiments, the edge coupler 11 may be comprised of a different dielectric material, such as silicon oxynitride, as well as other non-dielectric materials such as a III-V compound semiconductor material or a polymer.

The edge coupler 11 and the ring resonator 14 are arranged in different levels of the structure 10 with the edge coupler 11 positioned over the ring resonator 14 in elevation relative to the dielectric layer 34 and handle substrate 36. The center point 38 of the ring resonator 14 is laterally offset by the perpendicular distance d1 relative to the longitudinal axis 22 of the edge coupler 11, and the center point 38 of the ring resonator 14 is longitudinally offset by the perpendicular distance d3 (FIG. 1) from the facet 24. The lateral offset is adjusted (i.e., reduced) such that some of the segments 12 of the edge coupler 11 overlap with a portion of the ring resonator 14. In an alternative embodiment, the lateral offset may be selected such that the segments 12 of the edge coupler 11 and the ring resonator 14 are non-overlapping. The center point 38 of the ring resonator 14 is also vertically offset by a perpendicular distance d5 relative to the longitudinal axis 22 of the edge coupler 11. The vertical spacing for the offset is selected to reduce, but not eliminate, coupling with one or the other of light polarization modes (i.e., either transverse electric mode or transverse magnetic mode) and may compensate for the reduced lateral offset. In an embodiment, the perpendicular distance d5 providing the vertical spacing may be on the order of the mode size of the light received by the edge coupler 11 to ensure weak optical coupling.

Figure 7:
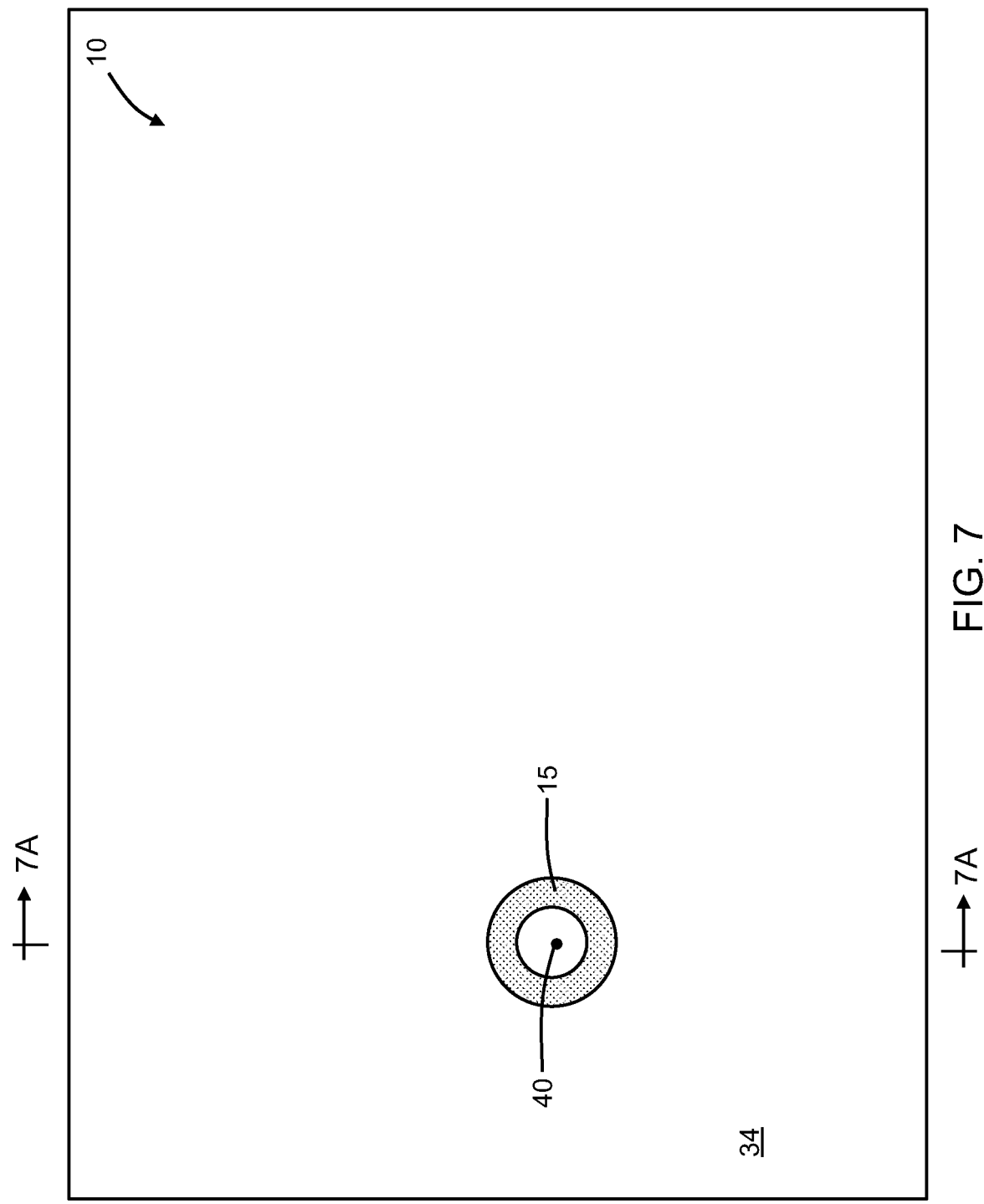
FIG. 7 is a top view of the structure at a fabrication stage subsequent to FIG. 6.
Figure 7A:
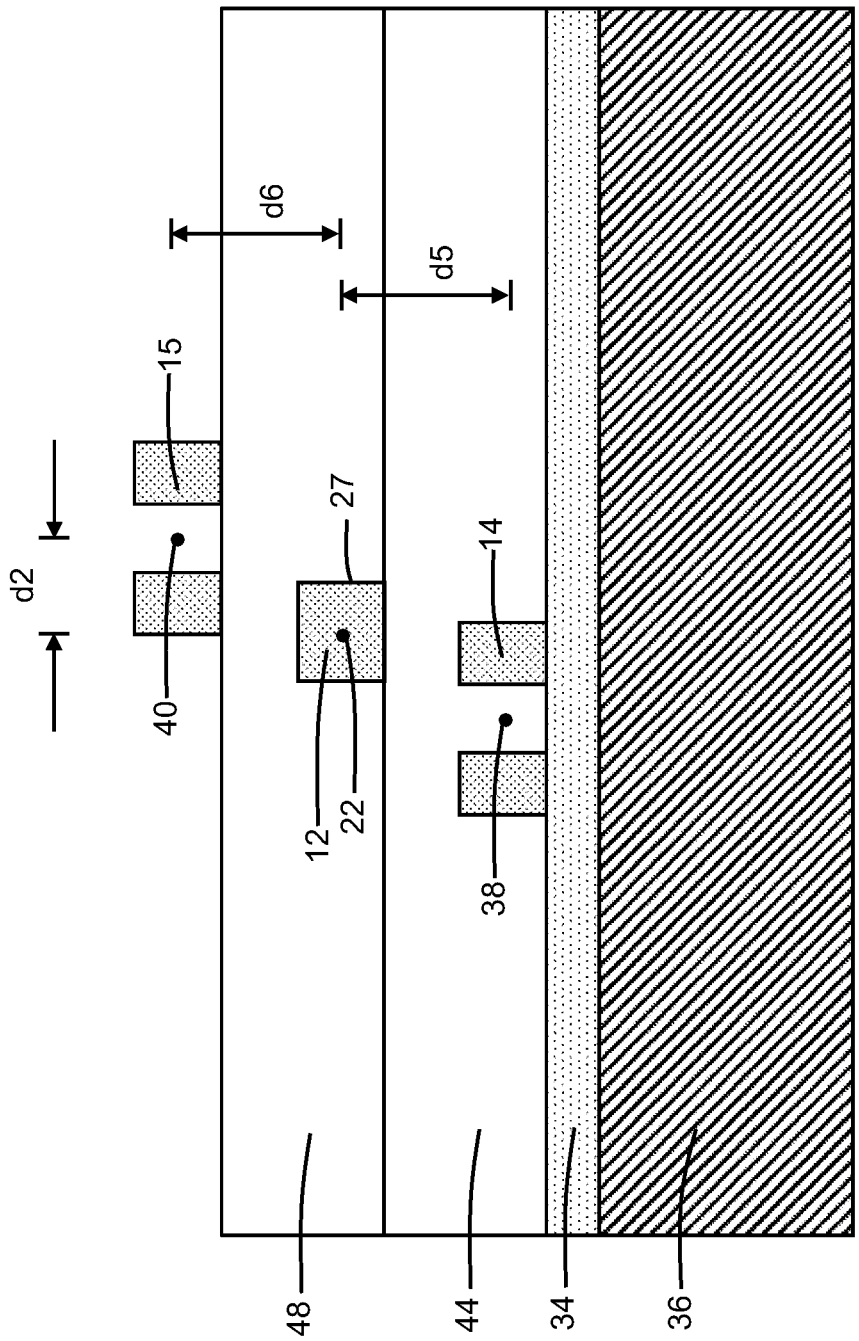
FIG. 7A is a cross-sectional view of the structure taken generally along line 7A-7A in FIG. 7.

With reference to FIGS. 7, 7A in which like reference numerals refer to like features in FIGS. 6, 6A and at a subsequent fabrication stage, a dielectric layer 48 is formed over the edge coupler 11, and the ring resonator 15 is formed on the dielectric layer 48. The dielectric layer 48 may be comprised of a dielectric material, such as silicon dioxide. The dielectric layer 48 may fully separate the ring resonator 15 from the edge coupler 11 with an intervening thickness of dielectric material. In an embodiment, the ring resonator 15 may be comprised of the same material as the ring resonator 14 and edge coupler 11. In an embodiment, ring resonator 15 may be comprised of a dielectric material, such as silicon nitride, that is deposited and patterned by lithography and etching processes. In alternative embodiments, the ring resonator 15 may be comprised of a different dielectric material, such as silicon oxynitride, as well as other non-dielectric materials such as a III-V compound semiconductor material or a polymer.

The edge coupler 11 and the ring resonator 15 are arranged in different levels of the structure 10 with the ring resonator 15 over the edge coupler 11 in elevation relative to the dielectric layer 34. The center point 40 of the ring resonator 15 is laterally offset by the perpendicular distance d2 relative to the longitudinal axis 22 of the edge coupler 11, and the center point 40 of the ring resonator 15 is longitudinally offset by the perpendicular distance d4 (FIG. 1) from the facet 24. The lateral offset may be adjusted (i.e., reduced) such that a portion of the ring resonator 15 overlaps with some of the segments 12 of the edge coupler 11. In an alternative embodiment, the lateral offset may be selected such that the ring resonator 14 and the segments 12 of the edge coupler 11 are non-overlapping. The center point 40 of the ring resonator 15 is also vertically offset by a perpendicular distance d6 relative to the longitudinal axis 22 of the edge coupler 11. The vertical spacing for the offset is selected to reduce, but not eliminate, coupling with one or the other of light polarization modes (i.e., either transverse electric mode or transverse magnetic mode) and may compensate for the reduced lateral offset. In an embodiment, the perpendicular distance d6 providing the vertical spacing may be on the order of the mode size of the light received by the edge coupler 11 to ensure weak optical coupling.

In the representative embodiment, the ring resonator 15 is an annular waveguide core. In an alternative embodiment, the ring resonator 15 may be a racetrack waveguide core (FIG. 4). In an alternative embodiment, the waveguide core 50 and the absorber 54 included in the waveguide core 50 may be formed adjacent to the ring resonator 15.

In an embodiment, the perpendicular distance d5 and the perpendicular distance d6 may be equal such that the ring resonators 14, 15 have a symmetrical placement transverse to the longitudinal axis 22 and transverse to the direction of light propagation. In an embodiment, the perpendicular distance d5 and the perpendicular distance d6 may be substantially equal such that the ring resonators 14, 15 have a substantially symmetrical placement transverse to the longitudinal axis 22 and transverse to the direction of light propagation.

Figure 8:
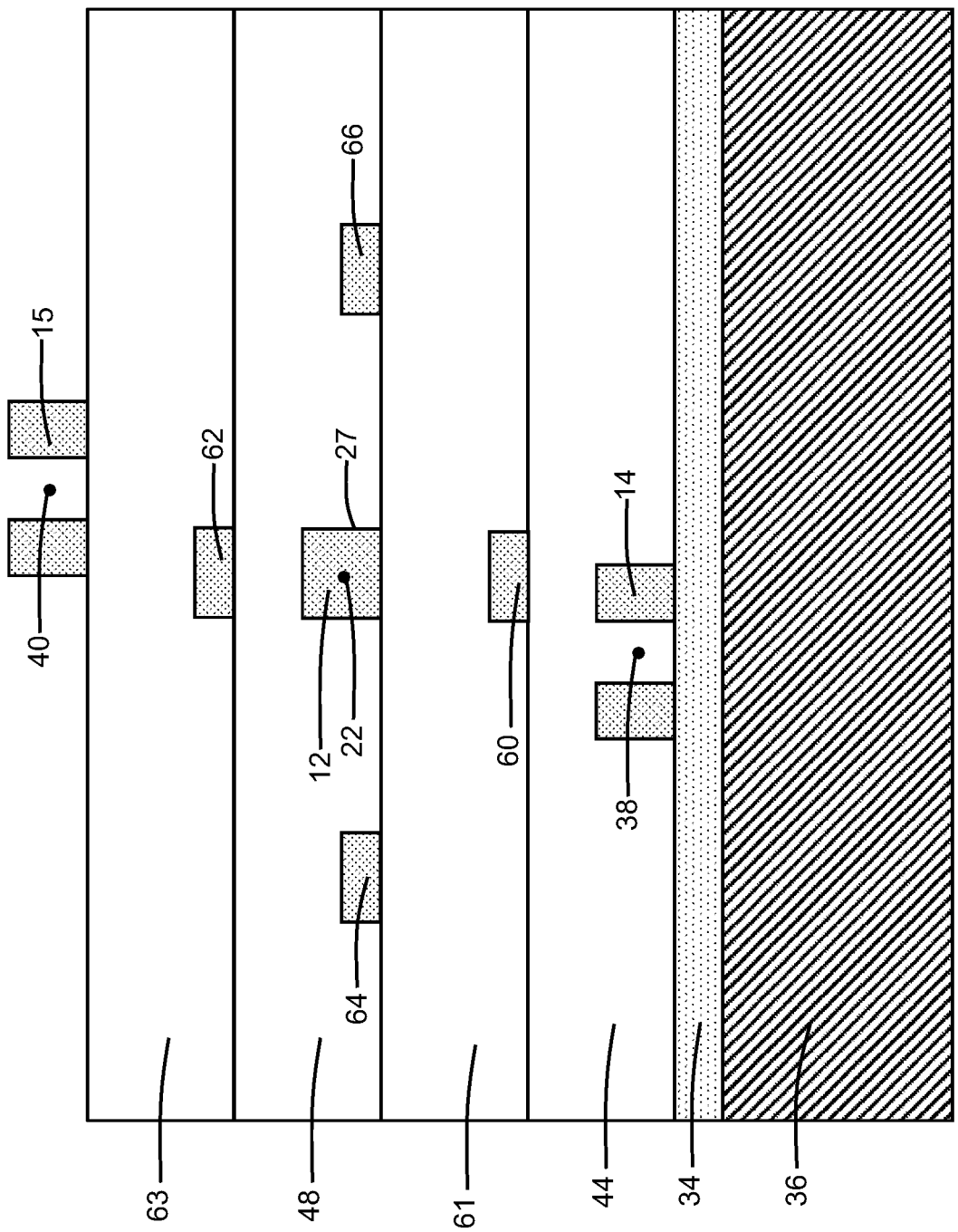
FIG. 8 is a cross-sectional view of a structure in accordance with alternative embodiments of the invention.

With reference to FIG. 8 and in accordance with alternative embodiments of the invention, additional waveguide core sections 60, 62, 64, 66 may be inserted into the structure 10. The waveguide core section 60 is positioned in a vertical direction between the ring resonator 14 and the edge coupler 11, and the waveguide core section 62 is positioned in a vertical direction between the ring resonator 15 and the edge coupler 11. The waveguide core section 60 may be positioned in a dielectric layer 61 that is formed after the dielectric layer 44 is formed but before the dielectric layer 48 is formed. The edge coupler 11 and waveguide core sections 64, 66 may be formed on the dielectric layer 61. The waveguide core sections 64, 66 may be positioned in the dielectric layer 48 adjacent to the edge coupler 11. The edge coupler 11 is positioned in a lateral direction between the waveguide core section 64 and the waveguide core section 66. The waveguide core section 62 may be positioned in a dielectric layer 63 formed after the dielectric layer 44 is formed. The ring resonator 15 may be formed on the dielectric layer 63.

The waveguide core sections 60, 62, 64, 66 may be comprised of the same material (e.g., silicon nitride) as the edge coupler 11 and ring resonators 14, 15. The dielectric layers 61, 63 may be comprised of a dielectric material, such as silicon dioxide. Each of the waveguide core sections 60, 62, 64, 66 may have tapers that extend from a wide end proximate to the facet 24 to an opposite narrow end that is spaced from the facet 24.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   an edge coupler having a longitudinal axis and a facet;
   a first waveguide core including a first light absorber;
   a second waveguide core including a second light absorber,
   a first ring resonator having a first center point that is spaced from the longitudinal axis of the edge coupler by a first perpendicular distance, the first ring resonator positioned adjacent to the first waveguide core; and
   a second ring resonator having a second center point that is spaced from the longitudinal axis of the edge coupler by a second perpendicular distance, the second ring resonator positioned adjacent to the second waveguide core,
   wherein the first light absorber and the second light absorber each comprise germanium, and the first ring resonator and the second ring resonator are symmetrically placed in a lateral direction transverse to the longitudinal axis of the edge coupler.

2. The structure of claim 1 wherein the first center point of the first ring resonator is laterally spaced by the first perpendicular distance from the longitudinal axis of the edge coupler, and the second center point of the second ring resonator is laterally spaced by the second perpendicular distance from the longitudinal axis of the edge coupler.

3. The structure of claim 2 wherein the first perpendicular distance is equal to the second perpendicular distance.

4. The structure of claim 2 wherein the first center point of the first ring resonator is vertically spaced by a third perpendicular distance from the longitudinal axis of the edge coupler, and the second center point of the second ring resonator is vertically spaced by a fourth perpendicular distance from the longitudinal axis of the edge coupler.

5. The structure of claim 4 wherein the first perpendicular distance is substantially equal to the second perpendicular distance, and the third perpendicular distance is substantially equal to the fourth perpendicular distance.

6. The structure of claim 4 wherein the edge coupler overlaps with the first ring resonator, and the second ring resonator overlaps with the edge coupler.

7. The structure of claim 1 wherein the first center point of the first ring resonator is longitudinally spaced by a third perpendicular distance from a plane including the facet, and the second center point of the second ring resonator is longitudinally spaced by a fourth perpendicular distance from the plane including the facet.

8. The structure of claim 7 wherein the third perpendicular distance is substantially equal to the fourth perpendicular distance.

9. The structure of claim 1 wherein the first center point of the first ring resonator is vertically spaced by a third perpendicular distance from the longitudinal axis of the edge coupler, and the second center point of the second ring resonator is vertically spaced by a fourth perpendicular distance from the longitudinal axis of the edge coupler.

10. The structure of claim 9 wherein the first perpendicular distance is substantially equal to the second perpendicular distance, and the third perpendicular distance is substantially equal to the fourth perpendicular distance.

11. The structure of claim 9 wherein the edge coupler overlaps with the first ring resonator, and the second ring resonator overlaps with the edge coupler.

12. The structure of claim 1 wherein the edge coupler comprises a material, and the first ring resonator and the second ring resonator each comprise the material.

13. The structure of claim 1 wherein the first ring resonator is laterally positioned between the edge coupler and the first waveguide core, the second ring resonator is laterally positioned between the edge coupler and the second waveguide core, and the first waveguide core is spaced from the first ring resonator by a first gap.

14. The structure of claim 1 wherein the first ring resonator is an annular waveguide core centered about the first center point, and the second ring resonator is an annular waveguide core centered about the second center point.

15. The structure of claim 1 wherein the first ring resonator is a racetrack waveguide core centered about the first center point, and the second ring resonator is a racetrack waveguide core centered about the second center point.

16. A method comprising:
    forming an edge coupler having a longitudinal axis and a facet;
    forming a first waveguide core including a first light absorber;
    forming a second waveguide core including a second light absorber,
    forming a first ring resonator having a first center point that is spaced from the longitudinal axis of the edge coupler by a first perpendicular distance; and forming a second ring resonator having a second center point that is spaced from the longitudinal axis of the edge coupler by a second perpendicular distance, wherein the first ring resonator is positioned adjacent to the first waveguide core, the second ring resonator is positioned adjacent to the second waveguide core, the first light absorber and the second light absorber each comprise germanium, and the first ring resonator and the second ring resonator are symmetrically placed in a lateral direction transverse to the longitudinal axis of the edge coupler.

17. The method of claim 16 wherein the first center point of the first ring resonator is laterally spaced by the first perpendicular distance from the longitudinal axis of the edge coupler, and the second center point of the second ring resonator is laterally spaced by the second perpendicular distance from the longitudinal axis of the edge coupler.

18. The method of claim 17 wherein the first center point of the first ring resonator is vertically spaced by a third perpendicular distance from the longitudinal axis of the edge coupler, and the second center point of the second ring resonator is vertically spaced by a fourth perpendicular distance from the longitudinal axis of the edge coupler.

19. The method of claim 16 wherein the first perpendicular distance is substantially equal to the second perpendicular distance.

20. The structure of claim 1 wherein the first perpendicular distance and the second perpendicular distance are approximately equal to a mode size of light received by the edge coupler.

\* \* \* \* \*